(12) United States Patent
Katayama et al.

(10) Patent No.: US 11,945,512 B2
(45) Date of Patent: Apr. 2, 2024

(54) LOWER STRUCTURE OF ELECTRIC VEHICLE

(71) Applicant: Mazda Motor Corporation, Hiroshima (JP)

(72) Inventors: Kenji Katayama, Hiroshima (JP);
Muneyuki Ohga, Hiroshima (JP);
Ryuhei Sumita, Hiroshima (JP);
Shuntaro Nakayama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 296 days.

(21) Appl. No.: 17/590,822

(22) Filed: Feb. 2, 2022

(65) Prior Publication Data
US 2022/0306213 A1 Sep. 29, 2022

(30) Foreign Application Priority Data
Mar. 26, 2021 (JP) ................. 2021-052671

(51) Int. Cl.
*B60K 1/04* (2019.01)
*B60L 1/04* (2006.01)
*B62D 25/20* (2006.01)

(52) U.S. Cl.
CPC ............. *B62D 25/20* (2013.01); *B60K 1/04* (2013.01); *B60L 1/04* (2013.01); *B60K 2001/0438* (2013.01)

(58) Field of Classification Search
CPC .... B60K 1/02; B60K 1/04; B60K 2001/0438; B60K 17/00; B62D 25/20; B60L 53/20
See application file for complete search history.

(56) References Cited

U.S. PATENT DOCUMENTS

| | | | | |
|---|---|---|---|---|
| 6,246,001 B1 * | 6/2001 | Fukui | .................. | H01R 9/0512 174/78 |
| 6,437,245 B1 * | 8/2002 | Hayashi | ............... | H01R 13/652 439/364 |
| 6,669,511 B1 * | 12/2003 | Yagi | ...................... | H01R 4/646 439/98 |
| 6,783,377 B2 * | 8/2004 | Aoyama | ............... | H01R 11/12 439/95 |

(Continued)

FOREIGN PATENT DOCUMENTS

JP 2015-220830 A 12/2015

*Primary Examiner* — Jason D Shanske
*Assistant Examiner* — James J Triggs
(74) *Attorney, Agent, or Firm* — XSENSUS LLP

(57) ABSTRACT

An electric vehicle includes a floor panel formed with a floor tunnel; a transmission; a transmission support member; an inverter attached to a case of the transmission; a battery unit disposed behind the transmission and on an outer side in a vehicle width direction of the floor tunnel; and a harness disposed such that an intermediate portion between a first end portion connected to the inverter and a second end portion connected to a front end portion of the battery unit 4 extends across the floor tunnel from inside to outside thereof. The battery unit has a substantially rectangular shape in a bottom view, and a corner on the floor tunnel side of a front end portion of the battery unit is cut out to form a free space between the front end portion of the battery unit and a portion of the floor tunnel behind the transmission support member.

13 Claims, 9 Drawing Sheets

(56) References Cited

U.S. PATENT DOCUMENTS

| | | | | |
|---|---|---|---|---|
| 7,210,947 B1* | 5/2007 | Fodero | ............... | H01R 13/6596 |
| | | | | 439/607.41 |
| 9,666,994 B2* | 5/2017 | Hwang | .................. | H01R 13/53 |
| 10,850,687 B2* | 12/2020 | Yamanaka | ............... | H02B 1/46 |
| 2002/0155738 A1* | 10/2002 | Ohsawa | ............... | B60Q 1/0094 |
| | | | | 439/98 |
| 2008/0242129 A1* | 10/2008 | Younce | .................... | H01R 4/64 |
| | | | | 439/100 |
| 2015/0151698 A1* | 6/2015 | Lee | ........................ | B21D 53/88 |
| | | | | 293/120 |
| 2015/0283955 A1* | 10/2015 | Sakamoto | ............. | F16B 5/0258 |
| | | | | 248/636 |
| 2015/0303660 A1* | 10/2015 | Sakamoto | ............ | B60L 3/0046 |
| | | | | 174/535 |
| 2016/0301160 A1* | 10/2016 | Nishida | .................... | B60R 13/16 |
| 2022/0281542 A1* | 9/2022 | Breu | ........................ | B60K 1/04 |
| 2022/0306213 A1* | 9/2022 | Katayama | ................ | B60K 1/04 |

* cited by examiner (a)

(b)

LOWER STRUCTURE OF ELECTRIC VEHICLE

CROSS-REFERENCE TO RELATED APPLICATION

The present application claims priority to Japanese application number 2021-052671 filed in the Japanese Patent Office on Mar. 26, 2021, the entire contents of which is incorporated herein by reference.

TECHNICAL FIELD

A technique disclosed herein relates to a lower structure of an electric vehicle.

BACKGROUND

An inverter arrangement structure in an electric vehicle is disclosed in Patent document 1. In detail, in the electric vehicle disclosed in Patent document 1, a transmission is disposed behind a so-called vertically-arranged engine, and a travel motor is provided between the engine and the transmission. An inverter for driving the travel motor is attached to a transmission case. This configuration contributes to elimination of a harness that connects the travel motor and the inverter.
[Patent document 1] JP-A-2015-220830

SUMMARY

Problems to be Solved

Traditionally, the transmission behind the vertically-arranged engine is arranged on the inside of a floor tunnel. There is a case where a rear portion of the transmission is supported by both side portions in a vehicle width direction of the floor tunnel by a transmission support member. In addition, a battery unit for supplying electric power to the motor via the inverter is typically arranged on an outer side of the floor tunnel, more specifically, on an outer side in the vehicle width direction of the floor tunnel on a lower side of a floor panel. In the case where it is desired to secure a sufficiently large arrangement space for the battery unit in order to increase capacity of the battery unit as much as possible, it is considered to arrange the battery unit at a position that is behind the transmission and is on the outer side in the vehicle width direction of the floor tunnel.

As described in Patent document 1, in the case where the inverter is attached to the transmission case, a first end portion of the harness is connected to the inverter, and a second end portion of the harness is connected to the battery unit. An intermediate portion between the first end portion and the second end portion of the harness is, for example, disposed to extend in a vehicle rear direction on the inside of the floor tunnel, cross the transmission support member, then extend across the floor tunnel from the inside to the outside thereof at the rear of the transmission support member, and reach the battery unit.

Here, in the vehicle in which the engine is vertically arranged, it is configured to separate the transmission from the transmission support member and retract the transmission during a frontal collision. There is a concern that, during the retraction of this transmission, the above-described harness is trapped between the battery unit and the transmission or the transmission support member.

A technique disclosed herein suppresses interference of a harness during a frontal collision in an electric vehicle.

Solutions to the Problems

A technique disclosed herein relates to a lower structure of an electric vehicle. The electric vehicle includes:
- a floor panel that is formed with a floor tunnel extending in a vehicle front-rear direction;
- a transmission that is arranged on inside of the floor tunnel;
- a transmission support member that is attached to the floor panel in a manner to stretch across both side portions in a vehicle width direction of the floor tunnel and supports a rear portion of a case of the transmission;
- an inverter that is attached to the case of the transmission and arranged on the inside of the floor tunnel;
- a battery unit that is arranged on a lower side of the floor panel, behind the transmission, and an outer side in the vehicle width direction of the floor tunnel; and
- a harness disposed such that a first end portion thereof is connected to the inverter, a second end portion thereof is connected to a front end portion of the battery unit, and, at the rear of the transmission support member, an intermediate portion between the first end portion and the second end portion extends across the floor tunnel from the inside to outside thereof, in which
- the battery unit has a substantially rectangular shape in a bottom view, and a corner on the floor tunnel side of the front end portion of the battery unit is cut out to form a free space between the front end portion of the battery unit and a portion of the floor tunnel at the rear of the transmission support member.

According to this configuration, the inverter is fixed to the case of the transmission. A motor of the electric vehicle may be provided between a vertically-arranged engine, for example, and the transmission disposed behind the engine. With this motor arrangement, a distance between the motor and the inverter, which is fixed to the case of the transmission, is short enough to eliminate a harness between the motor and the inverter.

The transmission is arranged on the inside of the floor tunnel. The battery unit is arranged on the lower side of the floor panel, behind the transmission, and the outer side in the vehicle width direction of the floor tunnel. Since a large space can be secured for the battery unit, this position is advantageous in increasing capacity of a battery.

In the above configuration, the inverter is disposed on the inside of the floor tunnel, and the battery unit is disposed on the outside of the floor tunnel. The harness that electrically connects the inverter and the battery unit is disposed to extend across the floor tunnel from the inside to the outside thereof at the rear of the transmission support member. When the harness is disposed just as described, the harness is possibly trapped between the transmission support member, which is retracted with the transmission, and the battery unit during a frontal collision of the electric vehicle.

In regard to interference of the harness, in the lower structure of the electric vehicle, the corner on the floor tunnel side of the front end portion of the battery unit, which has the substantially rectangular shape in the bottom view, is cut out. Due to the cutout of the battery unit, the free space is formed between the front end portion of the battery unit and the portion of the floor tunnel at the rear of the transmission support member.

In the case where the transmission support member is retracted with the transmission during the frontal collision of the electric vehicle, the harness, which extends across the floor tunnel from the inside to the outside thereof, can be evacuated to the free space. Therefore, the harness is suppressed from being trapped between the transmission support member and the battery unit.

The electric vehicle may include a battery support bracket that supports the battery unit, in which at a position behind the free space, the battery support bracket may be supported by the floor panel.

This suppresses interference between the retracted harness and the battery support bracket during the frontal collision of the electric vehicle.

A side portion of the battery unit may be adjacent to one of the side portions in the vehicle width direction of the floor tunnel, and the battery support bracket may be fixed to a tunnel crossmember that is disposed to stretch across both of the side portions in the vehicle width direction of the floor tunnel.

By attaching the battery support bracket to the tunnel crossmember, the battery support bracket can be located on a center side in the vehicle width direction. This allows the battery unit to be enlarged in the vehicle width direction as much as possible to a position near the floor tunnel. That is, the above configuration is advantageous in increasing the capacity of the battery.

A part of the intermediate portion of the harness may be supported by the case of the transmission.

In this way, the harness, which is supported by the case of the transmission, is retracted with the transmission during the frontal collision of the electric vehicle. Thus, it is possible to suppress contact between the harness and the transmission support member.

As it has been described so far, according to the lower structure of the electric vehicle, it is possible to suppress the interference of the harness during the frontal collision.

DETAILED DESCRIPTION

A description will hereinafter be made on an embodiment of a lower structure of an electric vehicle with reference to the drawings. The lower structure of the electric vehicle described herein is an example.

Figure 1:
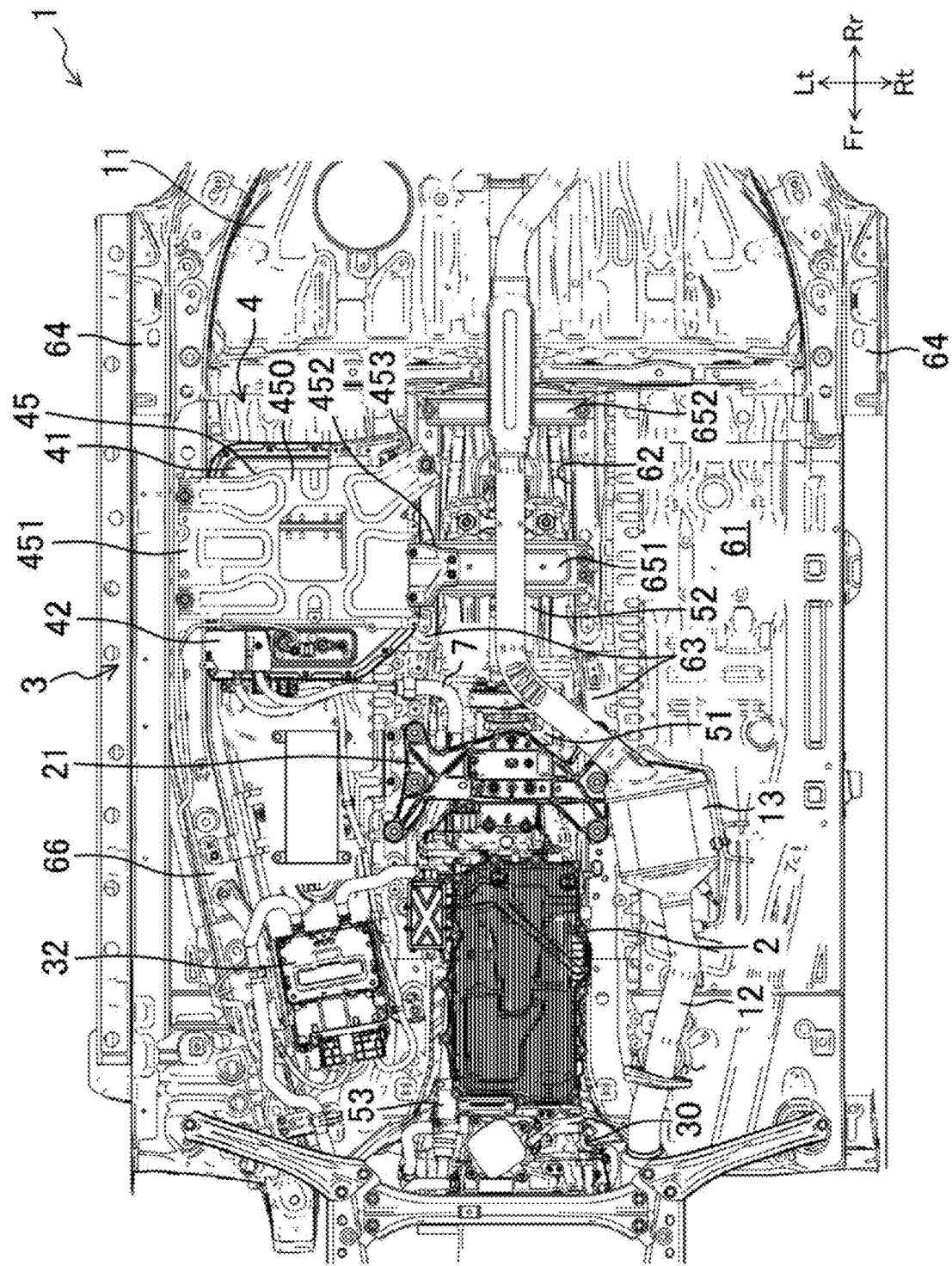
FIG. 1 is a bottom view of a lower structure of an exemplary electric vehicle.
Figure 2:
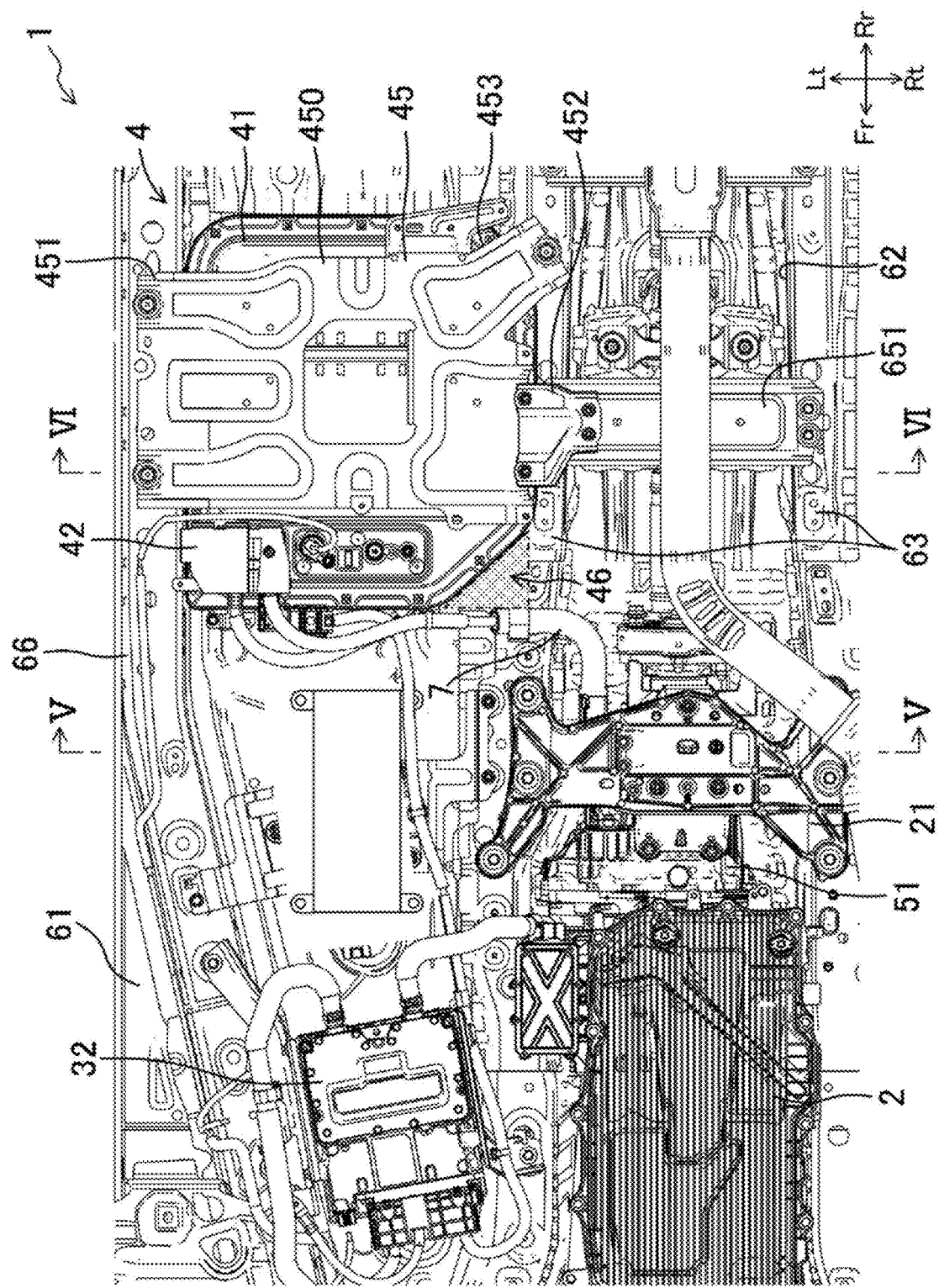
FIG. 2 is an enlarged view of a transmission and a battery unit.
Figure 3:
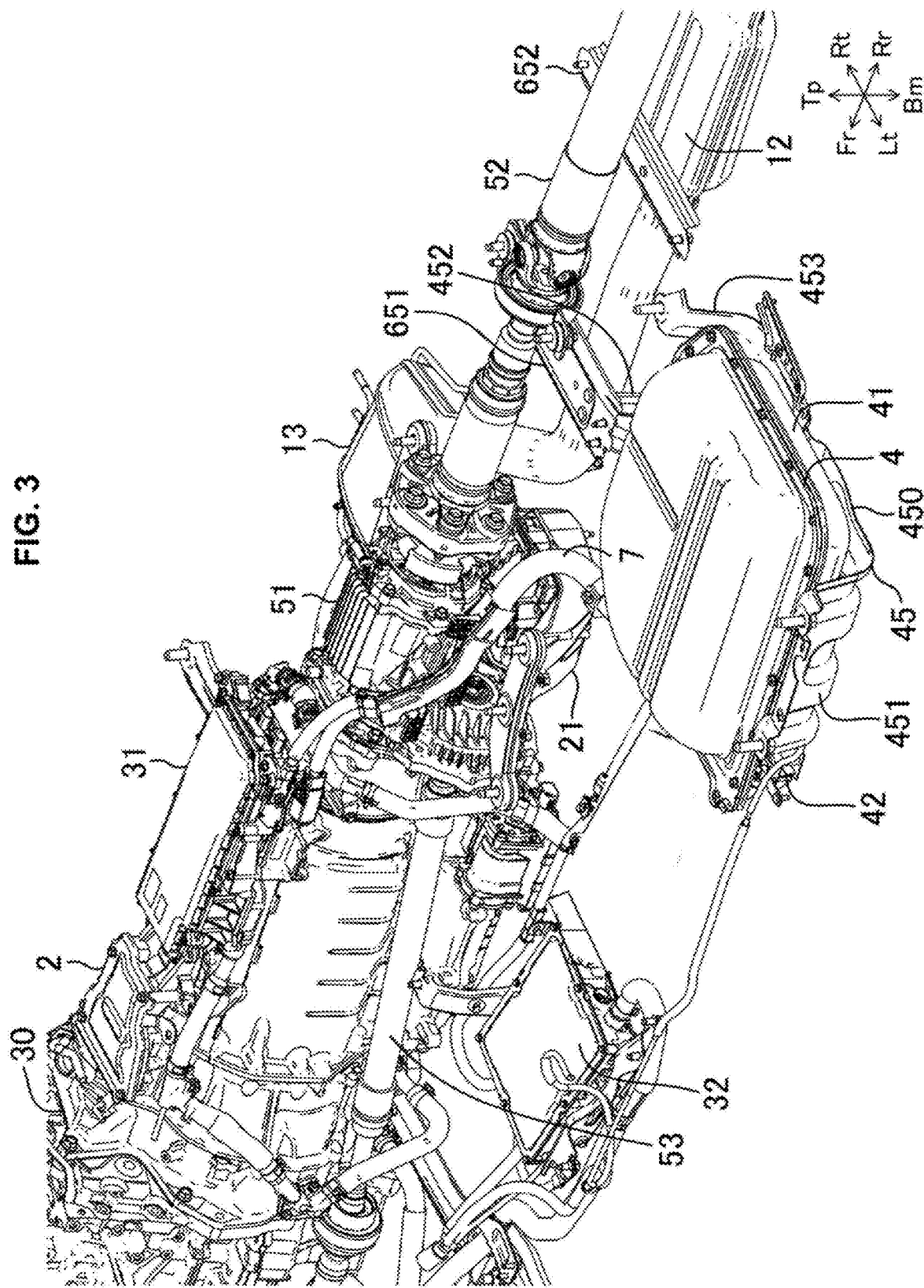
FIG. 3 is a perspective view of the lower structure of the electric vehicle.
Figure 4:
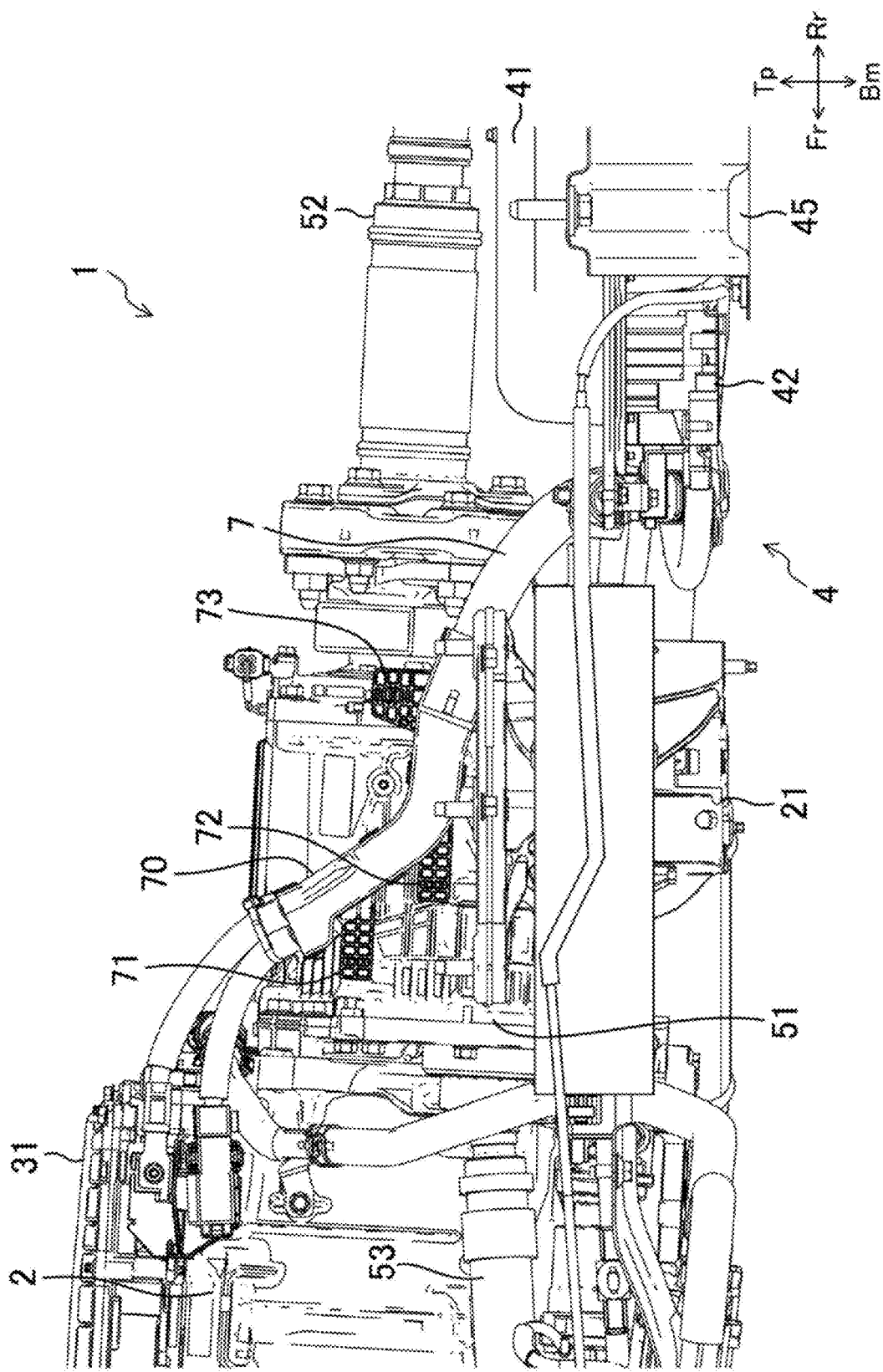
FIG. 4 is a side view of the lower structure of the electric vehicle.
Figure 5:
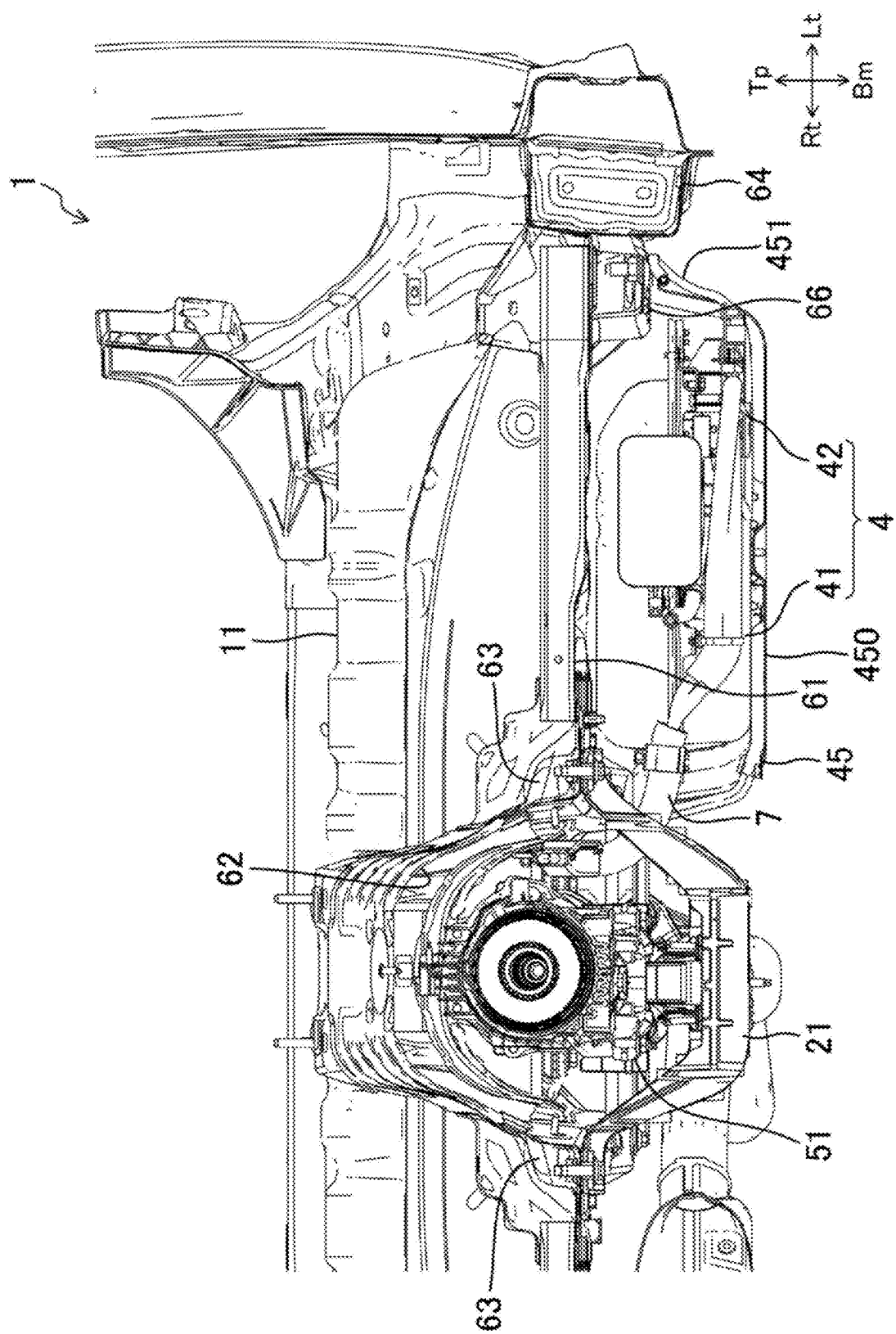
FIG. 5 is a cross-sectional view that is taken along V-V in FIG. 2.
Figure 6:
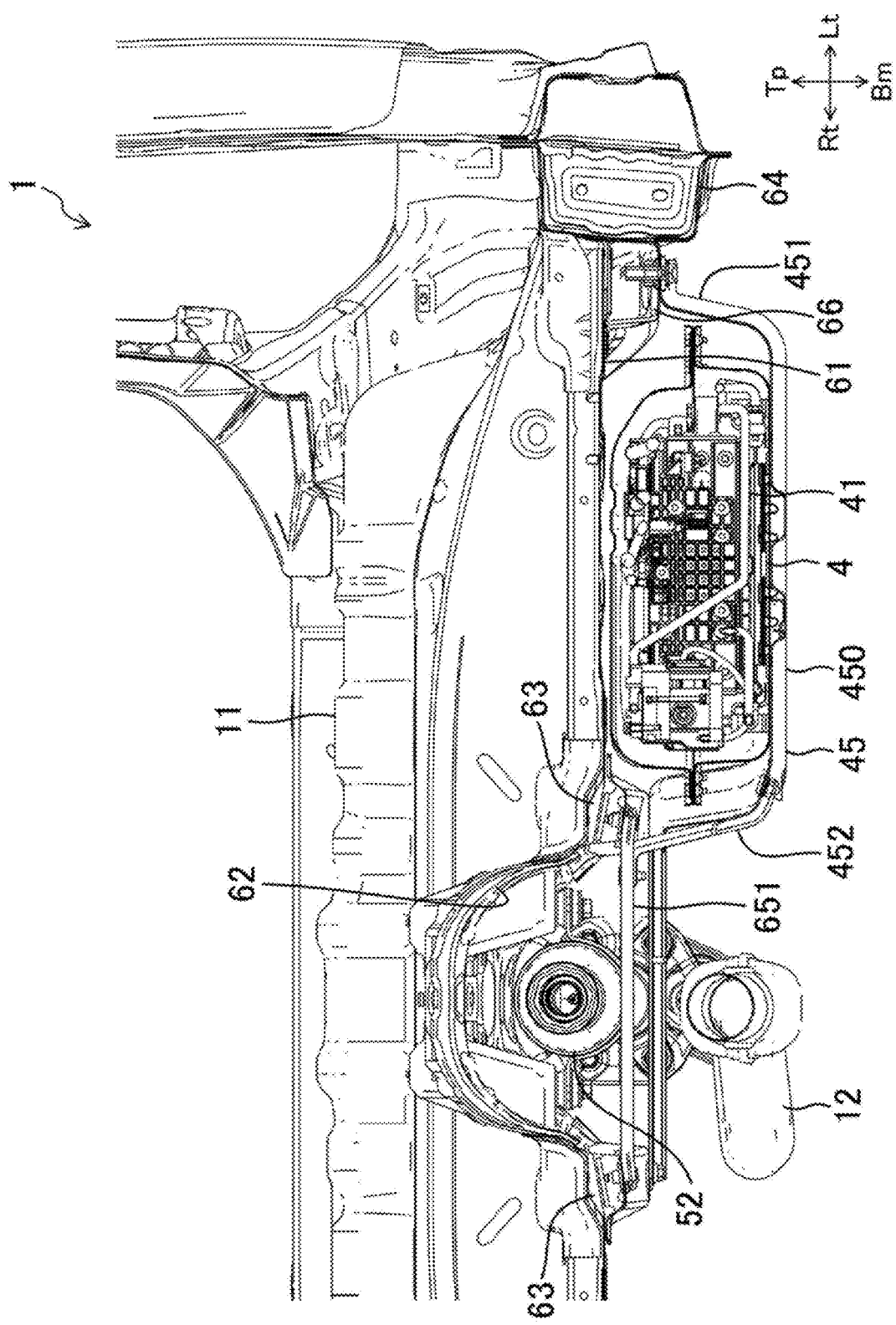
FIG. 6 is a cross-sectional view that is taken along VI-VI in FIG. 2.
Figure 7:
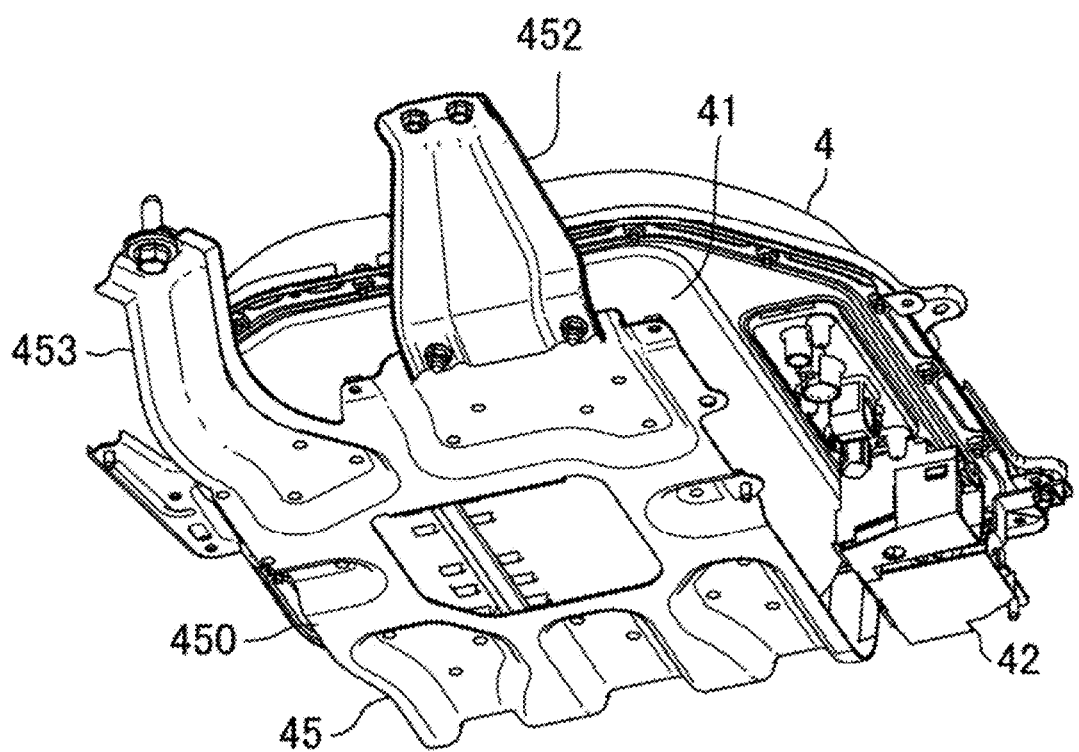
FIG. 7 is a perspective view of the battery unit.
Figure 7:
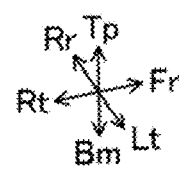

FIG. 1 is a bottom view of a lower structure of an exemplary electric vehicle 1, and FIG. 2 is an enlarged view of arrangement positions of a transmission 2 and a battery unit 4 in FIG. 1. FIG. 3 is a perspective view of a case where the lower structure of the electric vehicle 1 is seen obliquely downward from the rear in a state where a floor panel is removed. FIG. 4 is a side view of a case where the lower structure of the electric vehicle 1 is seen from the left in the state where the floor panel is removed, and FIG. 5 and FIG. 6 are a cross-sectional view that is taken along V-V in FIG. 2 and a cross-sectional view that is taken along VI-VI in FIG. 2. FIG. 7 is a perspective view in which the battery unit 4 is seen obliquely from below. In the following description, "front", "rear", "up", and "down" respectively correspond to "front", "rear", "top", and "down" in the electric vehicle 1, and "right" and "left" respectively correspond to "right" and "left" in a posture of the electric vehicle 1 facing an advancing direction. A right-left direction of the electric vehicle 1 may also be referred to as a vehicle width direction.

A floor panel 61 is disposed in a lower portion of the electric vehicle 1. The floor panel 61 constitutes a cabin floor of the electric vehicle 1. The floor panel 61 extends in a front-rear direction and the vehicle width direction in a manner to connect two side sills 64 that are disposed in side portions in the vehicle width direction of the electric vehicle 1.

A floor tunnel 62 is provided in a central portion in the vehicle width direction of the floor panel 61. The floor tunnel 62 bulges upward from the floor panel 61 as illustrated in FIG. 5 or FIG. 6, and extends in the front-rear direction as illustrated in FIG. 1 or FIG. 2. A tunnel side frame 63 is disposed in each side portion in the vehicle width direction of the floor tunnel 62. As illustrated in FIG. 5 or FIG. 6, the tunnel side frame 63 is a highly rigid frame having a closed cross section, and extends along the floor tunnel 62 in the front-rear direction. Tunnel crossmembers 651, 652 are attached to specified positions in the floor tunnel 62, more specifically, two positions in a rear portion of the floor tunnel 62. The first tunnel crossmember 651 on the front side extends in the vehicle width direction in a manner to connect the two tunnel side frames 63 (also see FIG. 6). The first tunnel crossmember 651 is located behind a transmission support member 21, which will be described below. The second tunnel crossmember 652 on the rear side also extends in the vehicle width direction in the manner to connect the two tunnel side frames 63. The first tunnel crossmember 651 has a greater width in the front-rear direction than the second tunnel crossmember 652.

A floor side frame 66 is disposed between the side sill 64 and the tunnel side frame 63. Although FIG. 1 only illustrates the floor side frame 66 on the left side of the floor tunnel 62, the floor side frame 66 is also disposed on the right side of the floor tunnel 62. The two floor side frames 66 are disposed in a bilaterally-symmetrical manner.

As illustrated in FIG. 5 or FIG. 6, the floor side frame 66 is also a highly rigid frame having a closed cross section. In a front end portion of the floor panel 61, the floor side frame 66 is located in the middle between the side sill 64 and the tunnel side frame 63 in the vehicle width direction. From the above position, the floor side frame 66 extends obliquely outward in the vehicle width direction to the rear of the electric vehicle 1, and abuts an inner side of the side sill 64 at a position near a central portion in the front-rear direction of the floor panel 61. The floor side frame 66 that abuts the inner side of the side sill 64 extends straight toward the rear of the electric vehicle 1 along the inner side of the side sill 64.

Hereinafter, the floor panel 61, the floor tunnel 62, the tunnel side frame 63, the side sill 64, the first tunnel crossmember 651, the second tunnel crossmember 652, and the floor side frame 66 may collectively be referred to as the floor panel 61.

The electric vehicle 1 includes an engine, which is not illustrated, the transmission 2, and an electric drive system 3. The electric vehicle 1 is a four-wheel-drive vehicle that is based on a front-engine, rear-wheel-drive vehicle. The electric vehicle 1 further includes a transfer 51, a rear propeller shaft 52, and a front propeller shaft 53.

The engine is a gasoline engine that is supplied with fuel at least containing gasoline, or a diesel engine that is supplied with diesel fuel. The engine is of a spark-ignition type or a compression-ignition type. However, a type of the engine is not particularly limited. The engine is installed in a so-called vertically-arranged manner in an engine compartment that is provided in a front portion of the electric vehicle 1. A fuel tank 11 is disposed in a rear portion of the electric vehicle 1. The fuel tank 11 stores the fuel to be supplied to the engine.

An exhaust pipe 12 for discharging exhaust gas from the engine is disposed on a lower side of the floor panel 61. The exhaust pipe 12 extends from the engine compartment towards the rear of the electric vehicle 1. In detail, the exhaust pipe 12, on the right side of the floor tunnel 62, extends from the engine compartment toward the rear of the electric vehicle 1, is bent to a center side in the vehicle width direction, and further extends toward the rear of the electric vehicle 1 along the floor tunnel 62. A catalytic converter 13 is disposed in the middle of the exhaust pipe 12. The catalytic converter 13 is located on a right side of a rear end portion of a case of the transmission 2, which will be described below.

The electric drive system 3 includes an electric motor 30, an inverter 31, and the battery unit 4. The electric motor 30 is disposed on an output shaft of the engine. The electric motor 30 is interposed between the engine and the transmission 2. The electric motor 30 outputs drive torque for travel of the vehicle during power running, and also performs regeneration to apply a braking force to the vehicle.

For example, the transmission 2 is an automatic transmission that includes at least one planetary gear mechanism. However, the transmission 2 is not limited to the automatic transmission. The transmission 2 is joined to the output shafts of the engine and the electric motor 30. The transmission 2 changes and outputs the torque of the engine and/or the electric motor 30.

The transmission 2 is disposed behind the electric motor 30. As illustrated in FIG. 1 and FIG. 2, the transmission 2 is disposed on the inside of the floor tunnel 62. In a front portion of the floor tunnel 62, the case of the transmission 2 extends in the front-rear direction along the floor tunnel 62.

The transfer 51 is connected to an output shaft of the transmission 2. The transfer 51 is disposed behind the transmission 2 and on the inside of the floor tunnel 62. A case of the transfer 51 is integrated with the case of the transmission 2. Hereinafter, the case of the transfer 51 and the case of the transmission 2, which are integrated, will collectively be referred to as the "case of the transmission 2".

The rear end portion of the case of the transmission 2, more precisely, the case of the transfer 51 is supported by the transmission support member 21. The transmission support member 21 extends in the vehicle width direction in a manner to stretch between the two tunnel side frames 63. As also illustrated in FIG. 5, both end portions of the transmission support member 21 are fixed to the tunnel side frames 63. A central portion of the transmission support member 21 is fixed to a lower portion of the case of the transmission 2 and supports the transmission 2 from below.

The rear propeller shaft 52 and the front propeller shaft 53 are connected to the transfer 51. The transfer 51 distributes the torque of the engine and/or the electric motor 30 to front wheels and rear wheels.

On the inside of the floor tunnel 62, the rear propeller shaft 52 extends from the transfer 51 to the rear of the electric vehicle 1. The rear propeller shaft 52 is connected to a rear driveshaft that is joined to the right and left rear wheels via a rear differential gear, which is not illustrated.

On the inside of the floor tunnel 62, the front propeller shaft 53 extends from the transfer 51 to the front of the electric vehicle 1 through the left side of the transmission 2. The front propeller shaft 53 is connected to a front driveshaft that is joined to the right and left front wheels via a front differential gear, which is not illustrated.

As exemplified in FIG. 3 or FIG. 4, the inverter 31 is attached to an upper portion of the case of the transmission 2. The inverter 31 and the electric motor 30 are arranged in close proximity to each other. This configuration allows elimination of a harness for electrical connection between the inverter 31 and the electric motor 30. The inverter 31 and the electric motor 30 may electrically be connected via a bus bar, for example.

The battery unit 4 is electrically connected to the electric motor 30 via the inverter 31. The battery unit 4 supplies electric power for driving the electric motor 30 to the electric motor 30. In addition, during the regeneration of the electric motor 30, the battery unit 4 is charged. The inverter 31 supplies the electric power of the battery unit 4 to the electric motor 30 during the power running, and transmits the electric power generated by the electric motor 30 to the battery unit 4 during the regeneration.

As exemplified in FIG. 1 or FIG. 2, the battery unit 4 has a substantially rectangular shape in a bottom view. The battery unit 4 has a battery module 41 and a junction box 42. As also illustrated in FIG. 7, the junction box 42 is disposed in a front end portion of the battery unit 4. The battery module 41 is disposed behind the junction box 42.

On the lower side of the floor panel 61, the battery unit 4 is disposed on the left side of the floor tunnel 62. In detail, at a position behind the transmission 2 and in front of the fuel tank 11, the battery unit 4 is disposed between the tunnel side frame 63 and the floor side frame 66. That is, the battery unit 4 is disposed on an opposite side of the floor tunnel 62 from the exhaust pipe 12 and the catalytic converter 13 of the engine. This disposition structure allows the electric drive system 3 to be located away from a heat source. A DC/DC converter 32 illustrated in FIG. 1 or FIG. 2 constitutes a part of the electric drive system 3. On the left side of the floor tunnel 62, the DC/DC converter 32 is disposed on the left side of the transmission 2 and in front of the battery unit 4.

As described above, from the central portion to the rear portion in the front-rear direction of the floor panel 61, the floor side frame 66 is disposed to abut the side sill 64, and, in the rear portion of the floor panel 61, a distance in the vehicle width direction between the tunnel side frame 63 and the floor side frame 66 is long. The large battery unit 4 can be disposed in this large space. Thus, capacity of the battery unit 4 is relatively large.

The battery unit 4 is attached to the floor panel 61 by a battery support bracket 45. The battery support bracket 45 has a lower wall portion 450, a first vertical wall portion 451, a second vertical wall portion 452, and a third vertical wall portion 453. The lower wall portion 450 is located below the battery unit 4 and expands in a manner to cover a bottom surface of the battery unit 4. The lower wall portion 450 supports the battery unit 4 from below.

The first vertical wall portion 451 is located on the outer side (that is, the left side) in the vehicle width direction of the lower wall portion 450 and continues from a left edge of the lower wall portion 450. The first vertical wall portion 451 expands in the front-rear direction and the up-down direction on the left side of the battery unit 4. As illustrated in FIG. 5 or FIG. 6, an upper end portion of the first vertical wall portion 451 is fixed to the floor side frame 66.

The second vertical wall portion 452 is located on the center side (that is, the right side) in the vehicle width direction of the lower wall portion 450 and continues from a front portion of a right edge of the lower wall portion 450. The second vertical wall portion 452 extends in the up-down direction on the right side in a front portion of the battery unit 4. As illustrated in FIG. 2 or FIG. 6, an upper end portion of the second vertical wall portion 452 is fixed to the first tunnel crossmember 651. That is, the upper end portion of the second vertical wall portion 452 is located on the center side in the vehicle width direction from the tunnel side frame 63. In this way, the second vertical wall portion 452 is located at the substantially same position as the tunnel side frame 63 in the vehicle width direction. Since the second vertical wall portion 452 is located on the center side in the vehicle width direction, a right portion of the battery unit 4 can be located on the center side in the vehicle width direction, and the right portion of the battery unit 4 is adjacent to a left portion of the floor tunnel 62. That is, the battery unit 4 becomes large in size, and accordingly, the capacity of the battery unit 4 becomes large.

The third vertical wall portion 453 is located on the center side (that is, the right side) in the vehicle width direction of the lower wall portion 450 and continues from a rear portion of the right edge of the lower wall portion 450. The third vertical wall portion 453 extends in the up-down direction at a right corner of a rear portion of the battery unit 4. As illustrated in FIG. 2, the upper end portion of the second vertical wall portion 452 is fixed to the tunnel side frame 63. An upper end portion of the third vertical wall portion 453 is located on the outer side in the vehicle width direction of the upper end portion of the second vertical wall portion 452. Since the third vertical wall portion 453 is located at the right corner of the rear portion of the battery unit 4, the third vertical wall portion 453 does not interfere with the right portion of the battery unit 4 and does not adversely affect the large capacity of the battery unit 4.

As described above, the inverter 31 and the battery unit 4 are electrically connected to each other. A harness 7 is disposed between the inverter 31 and the battery unit 4. As illustrated in FIG. 3 or FIG. 4, a front end of the harness 7 is connected to a rear end portion of the inverter 31. A rear end of the harness 7 is connected to the junction box 42 of the battery unit 4. Since the inverter 31 is disposed in the upper portion of the case of the transmission 2 and the battery unit 4 is disposed behind the transmission 2 and on the lower side of the floor panel 61, the harness 7 is arranged such that a portion thereof between the front end and the rear end is inclined downward to the rear of the electric vehicle 1 (see FIG. 4). An inclined intermediate portion of the harness 7 is supported by the case of the transmission 2 at three portions of a first support portion 71, a second support portion 72, and a third support portion 73 via a harness support bracket 70. The first support portion 71, the second support portion 72, and the third support portion 73 are aligned in this order from the front to the rear of the electric vehicle 1.

In addition, as illustrated in FIG. 2, while the transmission 2 (and the inverter 31) is arranged on the inside of the floor tunnel 62, the battery unit 4 is arranged behind the transmission 2 and on the left side of the floor tunnel 62. Accordingly, the harness 7 is disposed in a manner to extend rearward on the inside of the floor tunnel 62, cross the transmission support member 21, and extend across the floor tunnel 62 from the inside to the outside thereof at the rear of the transmission support member 21.

Here, in order to retract the engine and the transmission 2 during a frontal collision, this electric vehicle 1 is structured to cancel the support of the transmission 2 by the transmission support member 21. When the transmission 2 is retracted, the harness 7, which is disposed across the floor tunnel 62 from the inside to the outside thereof at the rear of the transmission support member 21, is possibly trapped between the battery unit 4 and a pair of the retracted transmission 2 and the retracted transmission support member 21.

Accordingly, in this electric vehicle 1, the harness 7 is prevented from being trapped between the battery unit 4 and the pair of the transmission 2 and the transmission support member 21 during the frontal collision of the electric vehicle 1 by devising a shape of the battery unit 4. More specifically, as illustrated in FIG. 2, a corner on the floor tunnel 62 side of the front end portion of the battery unit 4 is cut out in a triangular shape in the bottom view. Due to this cutout, a triangular free space 46 is formed between the front end portion of the battery unit 4 and the floor tunnel 62 (see a shaded portion in FIG. 2).

Figure 8:
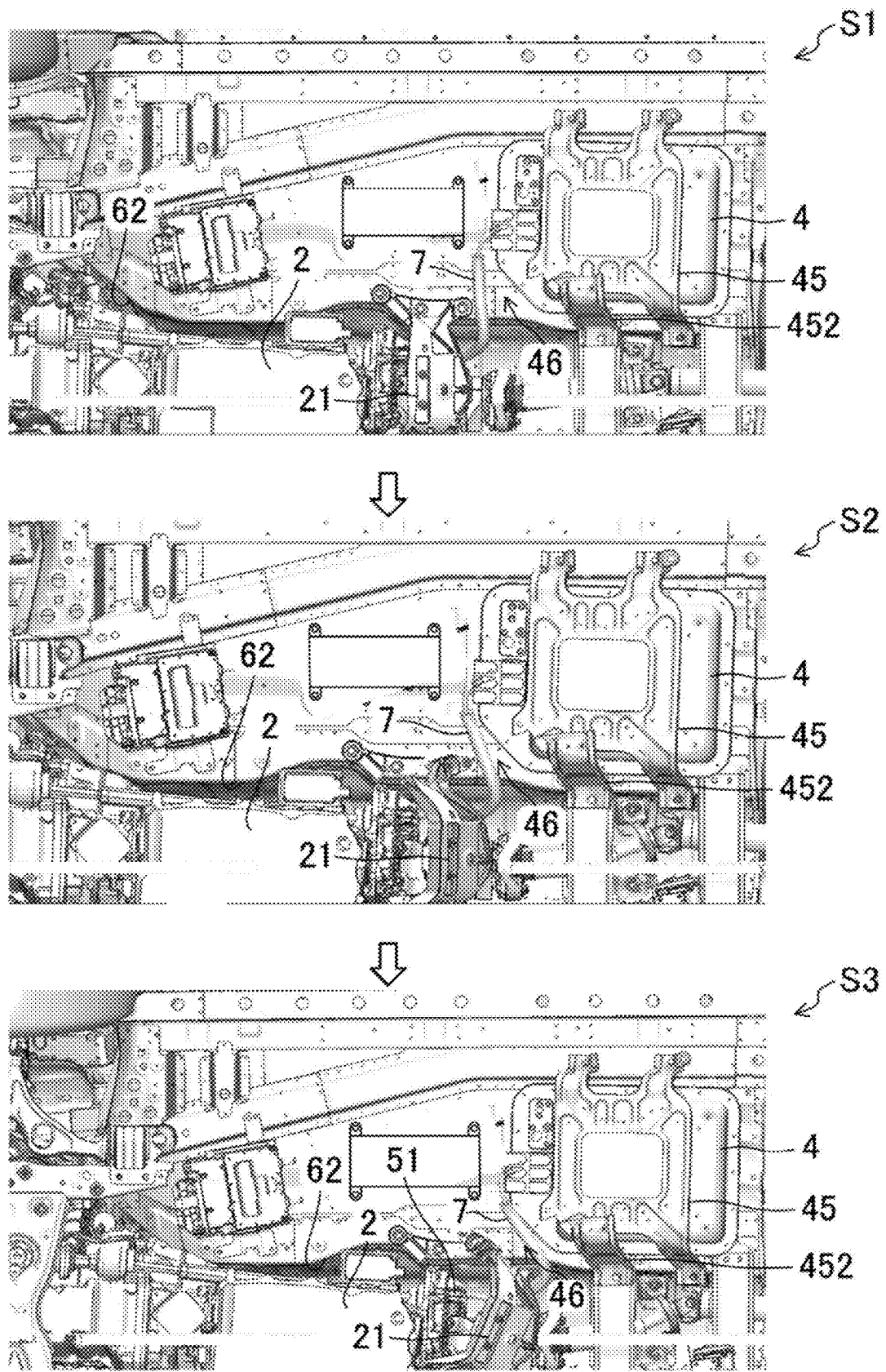
FIG. 8 includes transition views exemplifying movement of the transmission and a harness during a frontal collision of the electric vehicle.

FIG. 8 includes transition views exemplifying movement of the transmission 2 and the harness 7 during the frontal collision of the electric vehicle 1. Step S1 illustrates a state where the frontal collision occurs and the transmission 2 starts being retracted. Step S2 illustrates a state where the support of the transmission 2 by the transmission support member 21 is cancelled and the transmission 2 is further retracted. The front end of the harness 7 is connected to the inverter 31, and the intermediate portion thereof is supported by the case of the transmission 2. Accordingly, the harness 7 is retracted with the transmission 2. Thus, in step S2, the harness 7 is inclined obliquely at the rear of the transmission support member 21.

Step S3 illustrates a state where the transmission 2 is further retracted. The rear end portion of the case of the transmission 2 (that is, the transfer 51) moves to a position near the front end portion of the battery unit 4. The harness 7 is positioned obliquely along the cutout of the battery unit 4. Since the harness 7 is located in the free space 46, the harness 7 is not trapped between the battery unit 4 and the pair of the transmission 2 and transmission support member 21.

In addition, since the second vertical wall portion 452 of the battery support bracket 45 is located behind the free space 46, interference of the harness 7 with the battery support bracket 45 is suppressed.

Figure 9:
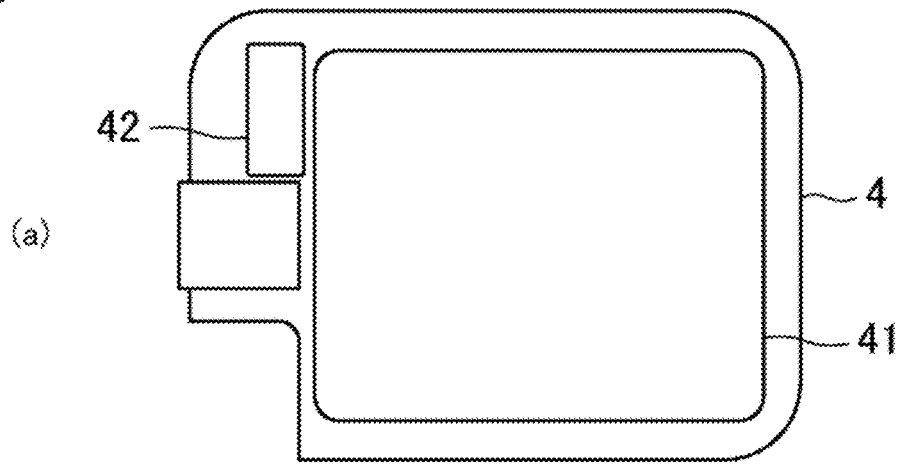
FIG. 9 includes modified embodiments of the battery unit.
Figure 9:
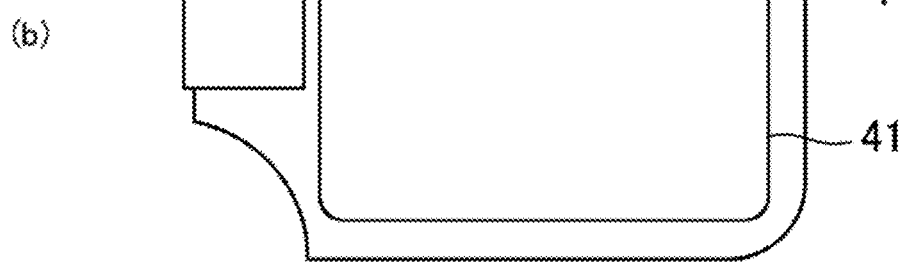

In the illustrated example, the corner of the battery unit 4 is cut out in the triangular shape in the bottom view. However, for example, as schematically exemplified in FIG. 9, the corner of the battery unit 4 may be cut out in a square shape in the bottom view (FIG. 9(a)) or may be cut out in a quadrant shape (FIG. 9(b)).

The technique disclosed herein is not limited to the application to the four-wheel-drive vehicle. The technique disclosed herein may be applied to the front-engine, rear-wheel-drive vehicle.

What is claimed is:

1. A lower structure of an electric vehicle, comprising:
a floor panel that is formed with a floor tunnel extending in a vehicle front-rear direction;
a transmission that is arranged inside of the floor tunnel;
a transmission support member that is attached to the floor panel in a manner to stretch across both side portions in a vehicle width direction of the floor tunnel and supports a rear portion of a case of the transmission;
an inverter that is attached to the case of the transmission and arranged on the inside of the floor tunnel;
a battery unit that is arranged on a lower side of the floor panel, behind the transmission, and an outer side in the vehicle width direction of the floor tunnel; and
a harness disposed such that a first end portion thereof is connected to the inverter, a second end portion thereof is connected to a front end portion of the battery unit, and, at a rear of the transmission support member, an intermediate portion thereof between the first end portion and the second end portion extends across the floor tunnel from the inside to outside, wherein
the battery unit has a substantially rectangular shape in a bottom view, and a corner on the floor tunnel side of the front end portion of the battery unit is cut out to form a free space between the front end portion of the battery unit and a portion of the floor tunnel at the rear of the transmission support member.

2. The lower structure of the electric vehicle according to claim 1 further comprising:
a battery support bracket that supports the battery unit, wherein
at a position behind the free space, the battery support bracket is supported by the floor panel.

3. The lower structure of the electric vehicle according to claim 2, wherein
a side portion of the battery unit is adjacent to one of the side portions in the vehicle width direction of the floor tunnel, and
the battery support bracket is fixed to a tunnel crossmember that is disposed to stretch across both of the side portions in the vehicle width direction of the floor tunnel.

4. The lower structure of the electric vehicle according to claim 1, wherein
a part of the intermediate portion of the harness is supported by the case of the transmission.

5. The lower structure of the electric vehicle according to claim 2, wherein
a part of the intermediate portion of the harness is supported by the case of the transmission.

6. The lower structure of the electric vehicle according to claim 3, wherein
a part of the intermediate portion of the harness is supported by the case of the transmission.

7. An electric vehicle, comprising:
a lower structure, wherein the lower structure includes
a floor panel that is formed with a floor tunnel extending in a vehicle front-rear direction;
a transmission that is arranged inside of the floor tunnel;
a transmission support member that is attached to the floor panel in a manner to stretch across both side portions in a vehicle width direction of the floor tunnel and supports a rear portion of a case of the transmission;
an inverter that is attached to the case of the transmission and arranged on the inside of the floor tunnel;
a battery unit that is arranged on a lower side of the floor panel, behind the transmission, and an outer side in the vehicle width direction of the floor tunnel; and
a harness disposed such that a first end portion thereof is connected to the inverter, a second end portion thereof is connected to a front end portion of the battery unit, and, at a rear of the transmission support member, an intermediate portion thereof between the first end portion and the second end portion extends across the floor tunnel from the inside to outside, wherein
the battery unit has a substantially rectangular shape in a bottom view, and a corner on the floor tunnel side of the front end portion of the battery unit is cut out to form a free space between the front end portion of the battery unit and a portion of the floor tunnel at the rear of the transmission support member.

8. The electric vehicle of claim 7, further comprising:
a battery support bracket that supports the battery unit.

9. The electric vehicle of claim 8, wherein at a position behind the free space, the battery support bracket is supported by the floor panel.

10. The electric vehicle of claim 9, wherein
a side portion of the battery unit is adjacent to one of the side portions in the vehicle width direction of the floor tunnel, and
the battery support bracket is fixed to a tunnel crossmember that is disposed to stretch across both of the side portions in the vehicle width direction of the floor tunnel.

11. The electric vehicle of claim 7, wherein
a part of the intermediate portion of the harness is supported by the case of the transmission.

12. The electric vehicle of claim 9, wherein
a part of the intermediate portion of the harness is supported by the case of the transmission.

13. The electric vehicle of claim 10, wherein
a part of the intermediate portion of the harness is supported by the case of the transmission.

* * * * *